US007706794B2

United States Patent
Jung et al.

(10) Patent No.: US 7,706,794 B2
(45) Date of Patent: Apr. 27, 2010

(54) WIRELESS CONNECTION METHOD BETWEEN PERSONALIZED DEVICES IN UBIQUITOUS ENVIRONMENT, PERSONALIZED DEVICE, AND WIRELESS CONNECTION SYSTEM USING THE SAME

(75) Inventors: Joon Young Jung, Daejeon (KR); Jeun Woo Lee, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 488 days.

(21) Appl. No.: 11/769,780

(22) Filed: Jun. 28, 2007

(65) Prior Publication Data

US 2008/0009246 A1    Jan. 10, 2008

(30) Foreign Application Priority Data

Jul. 7, 2006    (KR) ...................... 10-2006-0064083

(51) Int. Cl.
H04W 4/00    (2009.01)
(52) U.S. Cl. ................. 455/435.3; 455/435.2; 455/509; 455/512; 455/414.2
(58) Field of Classification Search ............. 455/412.1, 455/414.1, 414.2, 420, 435.2, 435.3, 509, 455/512, 166.2; 370/443, 217
See application file for complete search history.

(56) References Cited

U.S. PATENT DOCUMENTS

| 7,231,179 | B2 * | 6/2007 | Karusawa | ................. 455/41.2 |
| 7,394,788 | B2 * | 7/2008 | Kim et al. | ................. 370/331 |
| 7,428,217 | B2 * | 9/2008 | Kobayashi et al. | .......... 370/235 |

FOREIGN PATENT DOCUMENTS

| KR | 1020020066249 | 8/2002 |
| KR | 1020020066696 | 8/2002 |
| KR | 1020030048576 | 6/2003 |
| WO | WO 2004/068312 | 8/2004 |

* cited by examiner

Primary Examiner—Duc Nguyen
Assistant Examiner—Dominic E Rego
(74) Attorney, Agent, or Firm—Ladas & Parry LLP

(57) ABSTRACT

A method for connecting personalized devices through a wireless link, a personalized device, and a wireless connection system using the same are provided. In the method, wireless connection information of a plurality of coordinator devices connected to a personalized device through a wireless link up to now is stored and a priority of the coordinator device is decided using the stored connection information. Then, a channel is set to receive connection information, and connection information is received from a coordinator device through the set channel. If the coordinator device transmitting the connection information is the coordinator to connect, the coordinator device is connected. If not, a coordinator device having the next highest priority is decided.

12 Claims, 3 Drawing Sheets

WIRELESS CONNECTION METHOD BETWEEN PERSONALIZED DEVICES IN UBIQUITOUS ENVIRONMENT, PERSONALIZED DEVICE, AND WIRELESS CONNECTION SYSTEM USING THE SAME

CLAIM OF PRIORITY

This application claims the benefit of Korean Patent Application No. 10-2006-64083 filed on Jul. 7, 2006 in the Korean Intellectual Property Office, the disclosure of which is incorporated herein by reference.

BACKGROUND OF THE INVENTION

1. Field of the Invention

The present invention relates to a method for connecting personalized devices through a wireless link and, more particularly, to a method for connecting personalized devices through a wireless link by quickly and accurately deciding a coordinator to connect in a wireless environment having a plurality of coordinators, personalized devices, and a wireless connection system using the same.

2. Description of the Related Art

It is expected that a user may generally carry a plurality of personalized devices all the time and the personalized devices may smoothly communicate with each other in a future ubiquitous environment. In order to effectively use such personalized devices, it is important to quickly and accurately connect the personalized devices to one another.

As the digital technology has been generalized, media consumers' behavior pattern and consumption pattern have also changed. The advanced digital technology provides a digital environment that allows users to easily access contents regardless the types of media. As a result, the digital contents have been advanced to be personalized, mobilized, and interacted. Due to the variation of the digital contents, the relationship between a media provider and a consumer is also changed.

A personalized device provides a personalized and customized service. That is, the personalized device such as a computer automatically provides contents to a user suitable to the user's atmosphere or situation based on statistical data and personal service history a personal characteristic, a hobby, weather, a sense, and a situation. For example, a personalized device such as a sensing device measures a bio signal of a user in ubiquitous heath care system. In order to monitor the bio signal of a user and transmit the monitored bio signal to an expert, the personalized device is required to be connected to a coordinator device. When the personalized device such as a sensing device tries to connect to a predetermined coordinator device through a wireless link in a wireless environment having a plurality of coordinator devices, the personalized device needs to accurately and quickly decide one of the coordinator devices. If not, many problems may be arisen.

A conventional method of deciding a coordinator device to connect from a personalized device was defined in IEEE 802.15.4. In the conventional method, the coordinator device is decided in consideration of physical characteristics such as the intensity of received radio wave. The conventional method is not suitable to wireless connection between the coordinator devices and the personalized device.

SUMMARY OF THE INVENTION

The present invention has been made to solve the foregoing problems of the prior art and therefore an aspect of the present invention is to provide a method for connecting a personalized device to a coordinator device through a wireless link in ubiquitous environment by storing recent connection information to the coordinator device at the personalized device and deciding a coordinator device to connect according to a connection priority in a wireless environment having a plurality of coordinator devices, the personalized device, and a wireless connection system using the same.

According to an aspect of the invention, the invention provides a method of connecting personalized devices through a wireless link in a ubiquitous environment comprising: storing wireless connection information of a plurality of coordinator devices connected to a personalized device through a wireless link up to now and deciding a priority of a target coordinator to connect using the stored connection information; setting a channel to receive connection information from a coordinator device decided according to the priority; receiving connection information from a coordinator device through the set channel; determining whether the coordinator device transmitting the connection information is the target coordinator to connect or not, connecting to the coordinator device transmitting the connection information if the coordinator device transmitting the connection information is the target coordinator, and deciding a coordinator device having the next highest priority if the coordinator device transmitting the connection information is not the target coordinator; and performing the step of setting the channel to the step of determining repeatedly until a coordinator device transmitting the connection information is a target coordinator device to connect.

The method may further comprise requesting connection information to the target coordinator to connect through the channel after the step of setting the channel.

The method may further comprise storing the received connection information temporally to connect to a coordinator device having the next highest priority.

The receiving the connection information may comprise: determining whether connection information is received from the coordinator device or not; and receiving connection information while changing a channel until the connection information is received from the coordinator device if the connection information is not received.

According to another aspect of the invention, there is provided a personalized device comprising: a connection information storing unit for storing wireless connection information of a plurality of coordinator devices connected through a wireless link up to now; a priority deciding unit for deciding a priority of a target coordinator device to connect using the wireless connection information stored in the connection information storing unit; a channel setting unit for setting a channel to receive wireless connection information from the coordinator device; a communication module for communicating with the coordinator device through the set channel; a connection information receiver for receiving connection information from the coordinator device; and a connection information confirming unit for determining whether the coordinator device transmitting the connection information is a target coordinator device to connect when the connection information is received from the coordinator device, connecting to the coordinator device transmitting the connection information if the coordinator device transmitting the connection information is the target coordinator device to connect.

The personalized device may further comprise a temporal connection information storing unit for temporally storing the connection information received at the connection information receiver from the coordinator device in order to connect a coordinator having the next highest priority.

The channel setting unit may set a channel using the connection information of the coordinator device stored in the temporal connection information storing unit when a channel is set to connect to a coordinator device having the next highest priority.

The personalized device may further comprise a connection information requesting unit for requesting connection information to a coordinator decided according to the decided priority.

The priority deciding unit may decide a priority of a target coordinator device to connect according to an order of the most recently connected coordinator devices until now.

The priority deciding unit may decide a priority of a target coordinator device to connect according to an order of the most frequently connected coordinator devices until now.

The connection information confirming unit may decide a coordinator device having the next highest priority to connect if the coordinator device transmitting the connection information is not a target coordinator device to connect.

According to still another aspect of the invention, there is provided a system for connecting personalized devices through a wireless link in a ubiquitous environment comprising: a personalized device for storing connection information of a plurality of coordinator devices connected until now, deciding a priority of a coordinator device to connect using the stored connection information, requesting connection information to a coordinator device decided according to the priority, receiving connection information from the coordinator device, and connecting to the coordinator device; and a coordinator device for transmitting connection information in response to a connection information request from the personalized device, and transferring a service provided from a service providing server to the personalized device.

The personalized device may store the received connection information and connect to the coordinator device through a wireless link if the coordinator device transmitting the connection information is a target coordinator to connect to the personalized device, or decides a coordinator device having a next highest priority if the coordinator device transmitting the connection information is not the target coordinator.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Certain embodiments of the present invention will now be described in detail with reference to the accompanying drawings. In order to clearly describe the present invention, the descriptions of well-known functions or elements are omitted. Like numeral references denote like element throughout the accompanying drawings.

Figure 1:
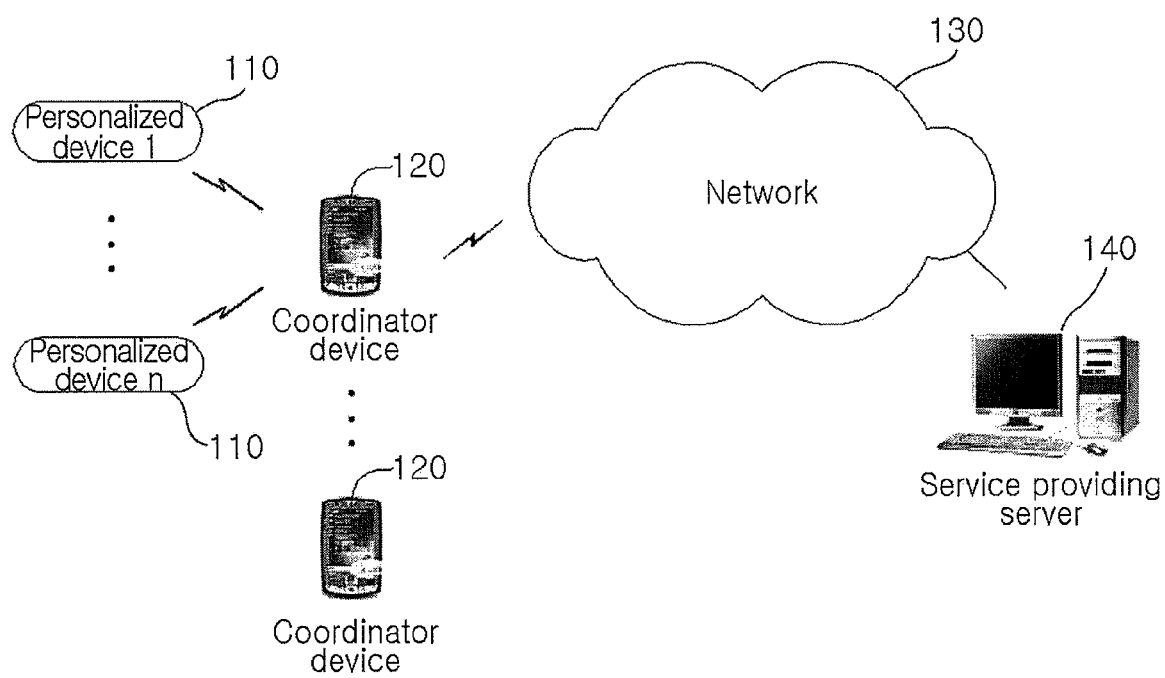
FIG. 1 is a diagram illustrating personalized devices connected to one another though a wireless link in a ubiquitous environment according to an embodiment of the present invention.

FIG. 1 is a diagram illustrating personalized devices connected to each others in a ubiquitous environment according to an embodiment of the present invention.

Referring to FIG. 1, a plurality of personalized devices 110 are connected to a personalized coordinator device 120 through a wireless link. The coordinator device 120 is connected to a service providing server 140 that provides various services through a network 130. In the ubiquitous environment shown in FIG. 1, one user may have a plurality of personalized devices and one coordinator device corresponding to the plurality of personalized devices. Also, a plurality of the users is present in the ubiquitous environment shown in FIG. 1.

The personalized device 110 is a device carried by a user to receive personalized services. The personalized device 110 accesses a predetermined coordinator device 120 and requests target services to the connected coordinator device 120. After receiving the service request, the coordinator device 120 accesses the service providing server 140 through the network 130. Then, the coordinator device 120 receives the corresponding services from the service providing server 140 and transmits related messages to the personalized device 110. Through the described method, the personalized device 110 can receive the personalized services in a ubiquitous environment that allows the user to access the network at anytime, at anywhere, and through any connection type comprising a wired/wireless connection type.

In order to receive such a personalized service, the personalized device 110 requires a method of accurately and rapidly decides one of coordinator devices 120.

Figure 2:
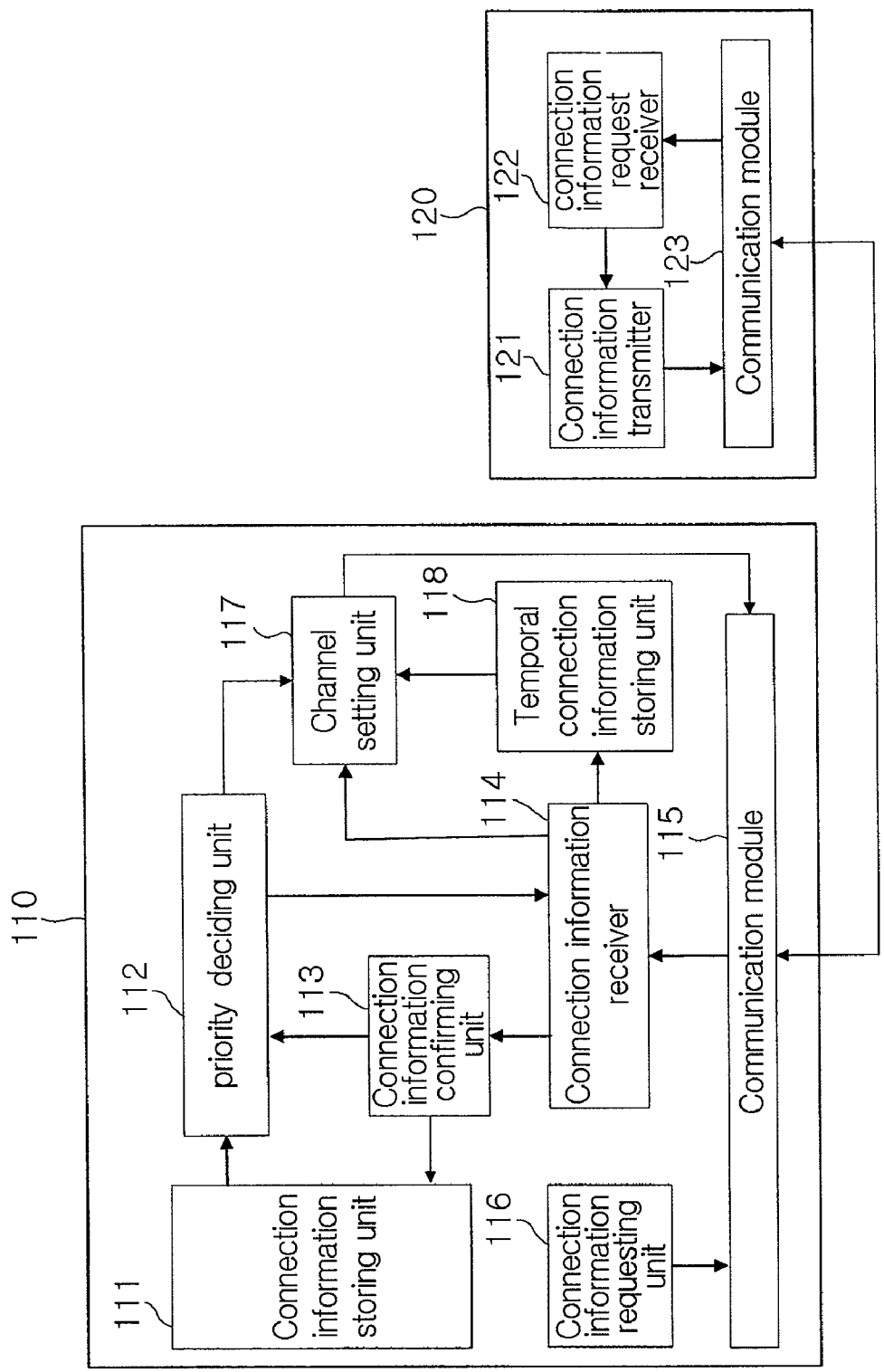
FIG. 2 is a block diagram illustrating a personalized device in a ubiquitous environment according to an embodiment of the present invention.

FIG. 2 is a block diagram illustrating a personalized device in a ubiquitous environment according to an embodiment of the present invention.

Referring to FIG. 2, the personalized device 110 according to the present embodiment comprises a connection information storing unit 111, a priority deciding unit 112, a connection information confirming unit 113, a connection information receiver 114, a communication module 115, a connection information requesting unit 116, a channel setting unit 117, and a temporal connection information storing unit 118.

The connection information storing unit 111 stores wireless connection information of a plurality of coordinator devices connected to a personalized device through a wireless link up to now.

The priority deciding unit 112 decides the priorities of coordinator devices according to a predetermined priority deciding method, for example, according to stored wireless connection information stored in the connection information storing unit 111 or according to an order of recently connected coordinator devices. In the present embodiment, it is preferable that the priority of the coordinator device is decided according to the order of recently connected coordinator devices. In another embodiment of the present invention, the priority may be decided according to the order of frequently connected coordinator devices.

In more detail, the personalized device is generally connected to a predetermined coordinator device through a wireless connection in order to receive a service customized for a predetermined user only. Therefore, it is preferable to decide the most recently connected coordinator device to have the highest priority or the most frequently connected coordinator to have the highest priority.

The channel setting unit 117 sets a channel to receive the connection information from a coordinator device to be connected according to the decided priority at the priority deciding unit 112.

The communication module 115 performs a communication operation in order to communicate with the coordinator device 120 through a channel set by the channel setting unit 117. Especially, the communication module 115 changes a current channel to the channel that is set by the channel setting unit 117.

The connecting information receiver 114 receives the connection information from the coordinator device 120 and temporally stores the received connection information at the temporal connection information storing unit 118. Herein, the channel setting unit 46 sets a channel until the connection information receiver 114 receives the connection information from a coordinator device decided at the priority deciding unit 112. The communication module 115 receives the connection information from a coordinator device while changing the set channel.

The connection information confirming unit 113 determines whether the received connection information of the coordinator device 120, which is received by the connection information receiving unit 114, is the connection information of a target coordinator device 120 to connect with the personalized device 110. If the connection information confirming unit 113 determines that the received connection information is received from the target coordinator device 120 to connect, the received connection information is stored into the connection information storing unit 111 and the target coordinator device 110 is connected through a wireless link. If the connection information confirming unit 113 determines that the received connection information is not received from the target coordinator device 120 to connect, a next coordinator device is connected according to a connection priority decided by the priority deciding unit 112. Herein, the connection information confirming unit 113 determines whether the connection information of the coordinator device having the next highest priority is stored in the temporal connection information storing unit or not. If the connection information confirming unit 113 determines that the connection information is stored in the temporal connection information storing unit, the channel setting unit 46 sets a new channel using the stored connection information, and the communication module 115 changes the current channel to the new channel. If the connection information confirming unit determines that corresponding connection information is not stored in the temporal connection information storing unit 118, the channel setting unit 117 sets a new channel for the coordinator device 120 having the next highest priority decided in the priority deciding unit 112 and the communication module 115 changes the current channel to the new channel.

The above described procedure is performed repeatedly until the connection information confirming unit 113 confirms that the coordinator device 120 transmitting the connection information is a target coordinator 120 to connect to the personalized device 110.

The connection information requesting unit 116 requests connection information to the coordinator device 120 from the personalized device 110 according to needs.

The coordinator device 120 comprises a connection information transmitter 121 for transmitting connection information to the personalized device 110, a connection information request receiver 122 for receiving a connection information transmission request from the personalized device 110, and a communication module 123 for communicating to the personalized device 110 through a predetermined channel.

The coordinator device 120 regularly transmits connection information to the communication module 123 through the connection information transmitter 121, and the communication module 123 transmits the connection information to the personalized device 110. Also, the coordinator device 120 receives the connection information request from the personalized device 110 through the communication module 123, and the connection information request receiver 122 processes the connection information request and requests the connection information transmitter 121 to transmit the connection information.

Figure 3:
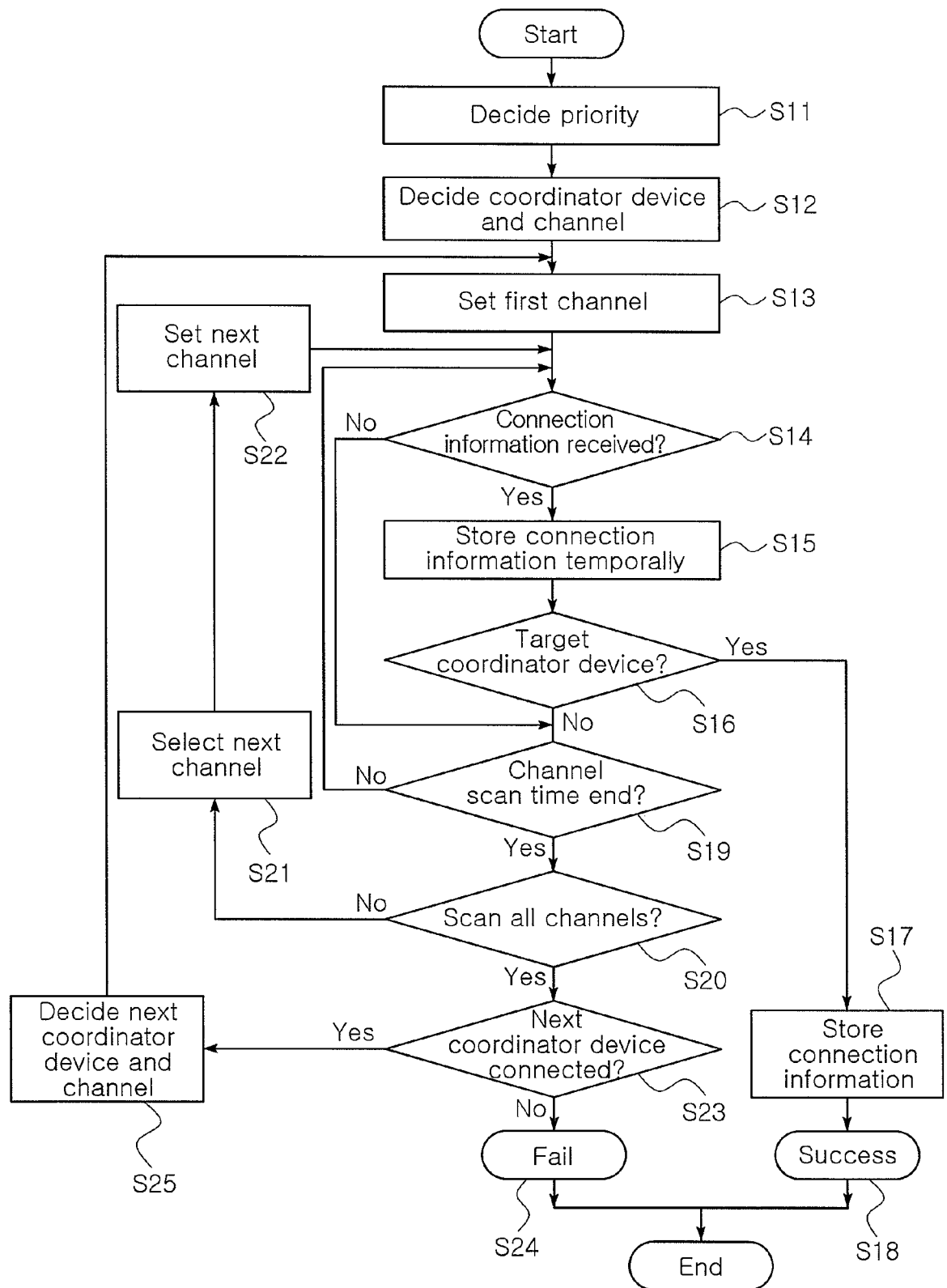
FIG. 3 is a flowchart illustrating a wireless connection method of a personalized device in a ubiquitous environment according to an embodiment of the present invention.

FIG. 3 is a flowchart illustrating a wireless connection method of a personalized device in a ubiquitous environment according to an embodiment of the present invention.

Referring to FIG. 3, the personalized device stores wireless connection information about a plurality of coordinator devices 120 which have been connected through a wireless link up to now, and decides the priority of a target coordinator device 120 to connect using the stored connection information at step S11. It is preferable that the priority is decided according to an order of the most recently connected coordinator devices from the personalized device or according to an order of the most frequently connected coordinator devices from the personalized device. Then, a coordinator device having the highest priority is selected according to the decided priority at step S12, and a first channel is set to receive the connection information from the selected coordinator device 120 at step S13. Then, it determines whether the connection information is received from the coordinator device through the set channel or not at step S14. If the connection information is not received from the coordinator device, it continuously determines whether the connection information is received or not through the current corresponding channel until a predetermined scan time is passed at step S21. If the connection information is received, the received connection information is stored in the temporal connection information storing unit 118 at step S15. It determines whether the coordinator device 120 transmitting the connection information is a target coordinator device 120 to connect to the personalized device 110 using the absolute address of the coordinator device 120 at step S16. If it confirms that the coordinator device 120 transmitting the connection information is the target coordinator device 120 to connect to the personalized device 110, the received connection information is stored in the connection information storing unit 11 at step S17. That is, the scan for wireless connection successes and the wireless connection is performed to the coordinator device 120 at step S18.

On the contrary, if the coordinator device transmitting the connection information is not the target coordinator device 120 to connect to the personalized device 110 at step S16 and if the scan time for the first channel is passed at step S19, all channels sequentially change and a predetermined channel is set until the connection information is received at steps S20 to S22.

Then, if the connection information is not received from the target coordinator device to connect to the personalized device 110 after scanning all channels of the highest coordinator device, it determines whether a coordinator device having the next highest priority is connected or not at step S23. If related operation is not performed to connect to the coordinator device having the next highest priority, it processes as connection failure at step S24. If related operation is performed to connect to the coordinator device having the next highest priority, the coordinator device having the next highest priority is decided and a channel is set to receive the connection information from the coordinator device at step S25.

The described procedures are repeatedly performed for each coordinator device according to the priority until the connection information is received from the target coordinator device to connect to the personalized device.

As described above, in order to decide a target coordinator device to connect in a wireless environment having a plurality of coordinator device, the personalized device decides the priority of each coordinator device using the recent connection information to the coordinator device and tries to connect to the coordinator devices according to the decided priority. Therefore, the target coordinator to connect can be accurately and quickly decided.

According to the certain embodiments of the present invention, a wireless connection between personalized devices can be quickly and accurately established in a ubiquitous environment. Therefore, users can effectively use personalized devices in the ubiquitous environment in which each of numerous users has a plurality of personalized devices.

While the present invention has been shown and described in connection with the preferred embodiments, it will be apparent to those skilled in the art that modifications and variations can be made without departing from the spirit and scope of the invention as defined by the appended claims.

What is claimed is:

1. A method of connecting personalized devices through a wireless link in a ubiquitous environment, the method comprising:
   storing wireless connection information of a plurality of coordinator devices connected to a personalized device through a wireless link up to now and deciding a priority of a target coordinator devices to connect using the stored connection information;
   setting a channel to receive connection information from a coordinator device decided according to the priority;
   receiving connection information from a coordinator device through the set channel;
   determining whether the coordinator device transmitting the connection information is the target coordinator to connect or not, connecting to the coordinator device transmitting the connection information if the coordinator device transmitting the connection information is the target coordinator, and deciding a coordinator device having the next highest priority if the coordinator device transmitting the connection information is not the target coordinator; and
   performing the operation of setting a channel to the operation of determining repeatedly until a coordinator device transmitting the connection information is a target coordinator device to connect.

2. The method according to claim 1, further comprising requesting connection information to the target coordinator to connect through the channel after the setting a channel.

3. The method according to claim 1, further comprising storing the received connection information temporally to connect to a coordinator device having the next highest priority.

4. The method according to claim 1, wherein the receiving connection information comprises:
   determining whether connection information is received from the coordinator device or not; and
   receiving connection information while changing a channel until the connection information is received from the coordinator device if the connection information is not received.

5. A personalized device for wireless connection in ubiquitous environment comprising:
   a connection information storing unit for storing wireless connection information of a plurality of coordinator devices connected through a wireless link up to now;
   a priority deciding unit for deciding a priority of a target coordinator device to connect using the wireless connection information stored in the connection information storing unit;
   a channel setting unit for setting a channel to receive wireless connection information from the coordinator device;
   a communication module for communicating with the coordinator device through the set channel;
   a connection information receiver for receiving connection information from the coordinator device; and
   a connection information confirming unit for determining whether the coordinator device transmitting the connection information is a target coordinator device to connect when the connection information is received from the coordinator device, connecting to the coordinator device transmitting the connection information if the coordinator device transmitting the connection information is the target coordinator device to connect.

6. The personalized device according to claim 5, further comprising a temporal connection information storing unit for temporally storing the connection information received at the connection information receiver from the coordinator device in order to connect a coordinator having the next highest priority.

7. The personalized device according to claim 6, wherein the channel setting unit sets a channel using the connection information of the coordinator device stored in the temporal connection information storing unit when a channel is set to connect to a coordinator device having the next highest priority.

8. The personalized device according to claim 5, further comprising a connection information requesting unit for requesting connection information to a coordinator decided according to the decided priority.

9. The personalized device according to claim 5, wherein the priority deciding unit decides a priority of a target coordinator device to connect according to an order of the most recently connected coordinator devices until now.

10. The personalized device according to claim 5, wherein the priority deciding unit decides a priority of a target coordinator device to connect according to an order of the most frequently connected coordinator devices until now.

11. The personalized device according to claim 5, wherein the connection information confirming unit decides a coordinator device having the next highest priority to connect if the coordinator device transmitting the connection information is not a target coordinator device to connect.

12. A system for connecting personalized devices through a wireless link in a ubiquitous environment, the system comprising:
   a personalized device for storing connection information of a plurality of coordinator devices connected until now, deciding a priority of a coordinator device to connect using the stored connection information, requesting connection information to a coordinator device decided according to the priority, receiving connection information from the coordinator device, and connecting to the coordinator device; and
   a coordinator device for transmitting connection information in response to a connection information request from the personalized device, and transferring a service provided from a service providing server to the personalized device, wherein the personalized device stores the received connection information and connects to the coordinator device through a wireless link if the coordinator device transmitting the connection information is a target coordinator to connect to the personalized device, or decides a coordinator device having a next highest priority if the coordinator device transmitting the connection information is not the target coordinator.

* * * * *